(12) United States Patent  (10) Patent No.: US 9,300,120 B1
Clough et al.  (45) Date of Patent: Mar. 29, 2016

(54) CHILDPROOF SAFETY OUTLET

(71) Applicants: Jay R. Clough, Mount Desert, ME (US);
Faith Gould, Mount Desert, ME (US)

(72) Inventors: Jay R. Clough, Mount Desert, ME (US);
Faith Gould, Mount Desert, ME (US)

( * ) Notice: Subject to any disclaimer, the term of this patent is extended or adjusted under 35 U.S.C. 154(b) by 79 days.

(21) Appl. No.: 14/264,643

(22) Filed: Apr. 29, 2014

(51) Int. Cl.
*H02G 3/12* (2006.01)
*H02G 3/08* (2006.01)

(52) U.S. Cl.
CPC ................................. *H02G 3/081* (2013.01)

(58) Field of Classification Search
CPC ...................................................... H02G 3/081
USPC ............................................................ 174/66
See application file for complete search history.

(56) References Cited

U.S. PATENT DOCUMENTS

| 4,250,349 | A | * | 2/1981 | Bennett | .................. | H02G 3/088 |
| | | | | | | 174/67 |
| 4,593,541 | A | | 6/1986 | Hollis | | |
| 4,596,908 | A | | 6/1986 | Mott | | |
| 5,243,135 | A | | 9/1993 | Shotey | | |
| 6,372,987 | B1 | | 4/2002 | Ha | | |
| 6,977,341 | B1 | * | 12/2005 | Gustaveson, II | ...... | G07F 15/003 |
| | | | | | | 174/66 |
| 7,094,969 | B1 | | 8/2006 | In | | |
| 8,399,765 | B1 | | 3/2013 | Baldwin et al. | | |
| D679,255 | S | | 4/2013 | Peckham | | |
| 2008/0156515 | A1 | | 7/2008 | Jiang | | |

* cited by examiner

*Primary Examiner* — Dhirubhai R Patel
(74) *Attorney, Agent, or Firm* — Kyle A. Fletcher, Esq.

(57) ABSTRACT

A childproof safety outlet is configured to install onto an existing electrical outlet. The electrical outlet cover includes at least one cover plate that is provided on an inner surface, and able to slide longitudinally in order to either expose or hide the electrical outlet. The electrical outlet cover includes armatures that attach to the cover plate in order to move the cover plate longitudinally. The armatures are each attached to a servomotor that is in wired communication with a control member. The servo motors, armatures, control member, and the cover plate are all located on the inner surface of the electrical outlet cover, and are not accessible when installed against the existing electrical outlet.

9 Claims, 5 Drawing Sheets

CHILDPROOF SAFETY OUTLET

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of electrical outlets, more specifically, an electrical outlet cover that works in conjunction with an existing electrical outlet in order to expose or close off access to said existing electrical outlet.

SUMMARY OF THE INVENTION

An embodiment of the disclosure meets the needs presented above by generally comprising an electrical outlet cover that is configured to install onto an existing electrical outlet. The electrical outlet cover includes at least one cover plate that is provided on an inner surface, and able to slide longitudinally in order to either expose or hide the electrical outlet. The electrical outlet cover includes armatures that attach to the cover plate in order to move the cover plate longitudinally. The armatures are each attached to a servomotor that is in wired communication with a control member. The servo motors, armatures, control member, and the cover plate are all located on the inner surface of the electrical outlet cover, and are not accessible when installed against the existing electrical outlet.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DETAILED DESCRIPTION OF THE EMBODIMENT

Figure 1:
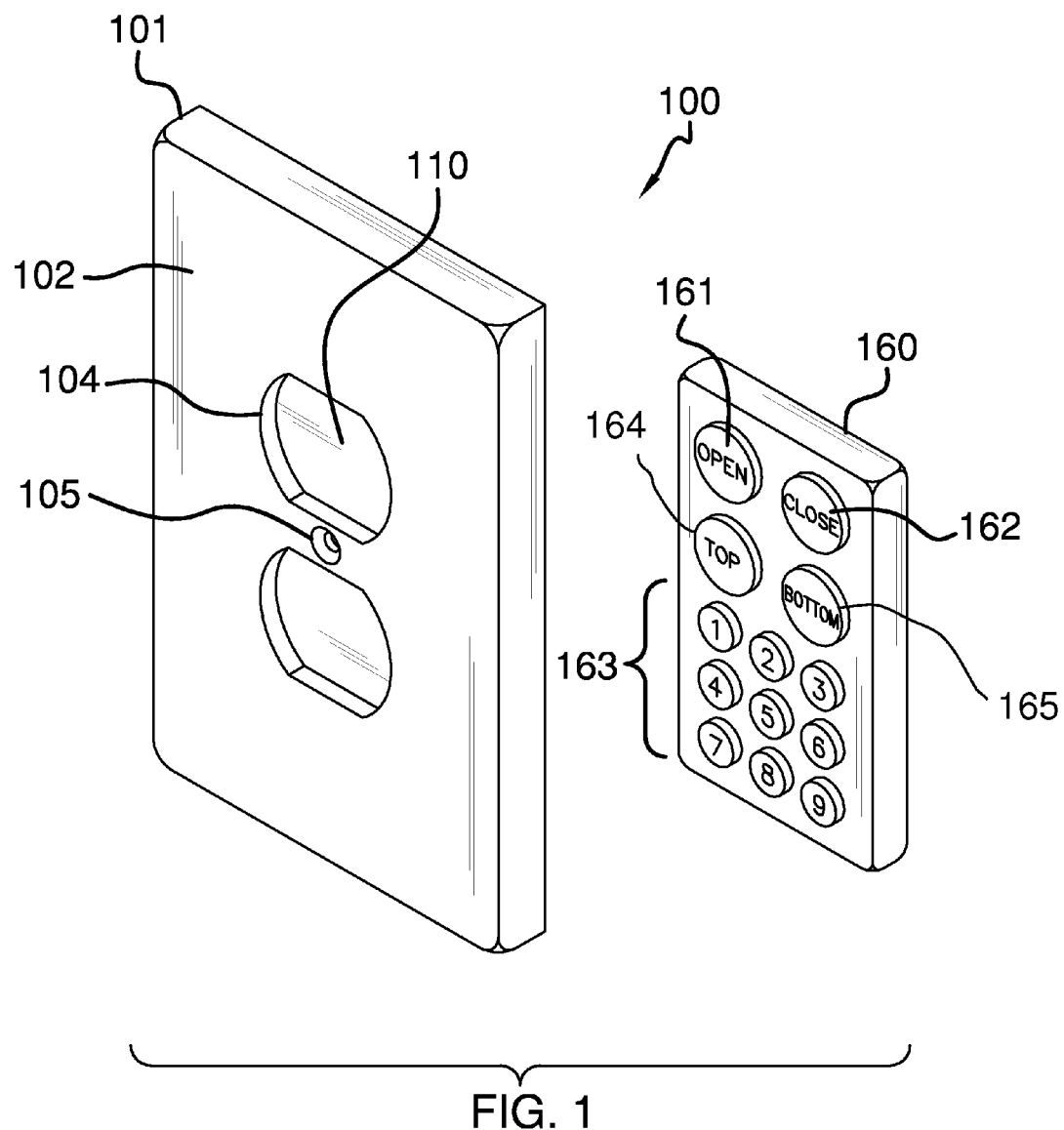
FIG. 1 is a perspective view of the childproof safety outlet by itself.
Figure 2:
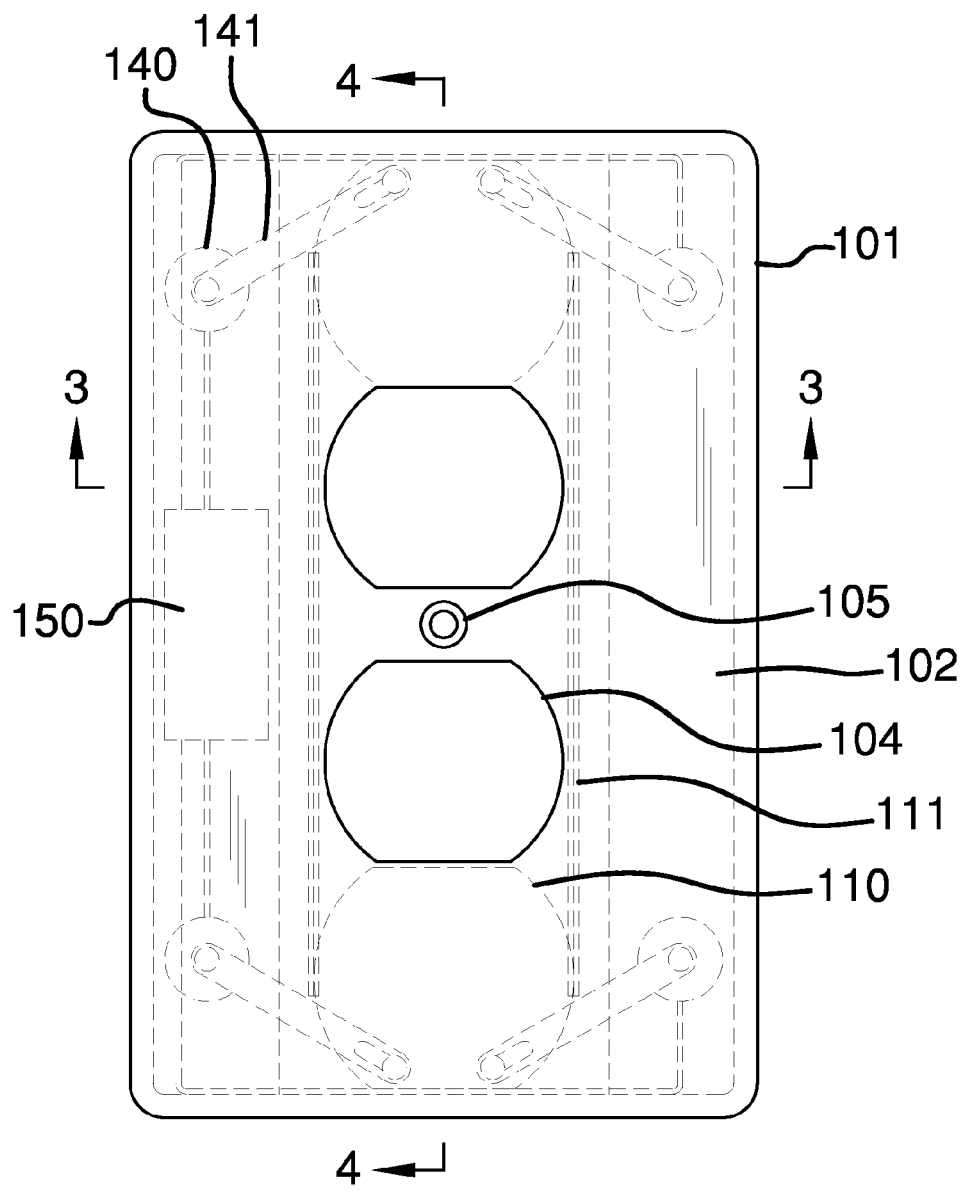
FIG. 2 is a front view of the childproof safety outlet.
Figure 3:
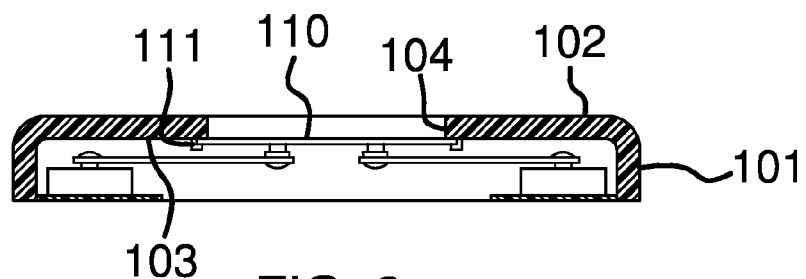
FIG. 3 is a cross-sectional view along line 3-3 in FIG. 2 of the childproof safety outlet.

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

As best illustrated in FIGS. 1 through 7, the childproof safety outlet 100 (hereinafter invention) generally comprises an electrical outlet cover 101 that is further defined with an outer surface 102 and an inner surface 103. The electrical outlet cover 101 includes at least one outlet opening 104, which is configured to enable access to an electrical outlet 200. It shall be noted that the invention 100 is configured for use with the electrical outlet 200, and more importantly, to control access to the electrical outlet 200.

The electrical outlet cover 101 includes a screw hole 105 that enables the electrical outlet cover 101 to be secured to an outlet screw hole 201 via a screw 300. The electrical outlet 200 is in turn secured to an electrical outlet box 210. The electrical outlet box 210 is in turn mounted to a wall surface 220.

The outlet opening(s) 104 of the electrical outlet cover 101 is unique to the invention 100 in that a cover plate 110 is able to slide longitudinally behind the electrical outlet cover 101 in order to leave open or close off the outlet opening 104. The cover plate 110 is supported on a guide rail 111, which is provided on the inner surface 103 of the electrical outlet cover 101. The guide rail 111 enables the cover plate 110 to move longitudinally in order to leave open or close off the outlet opening 104. It shall be noted that the cover plate 110 is adjacent to the inner surface 103 of the electrical outlet cover 101.

Figure 5:
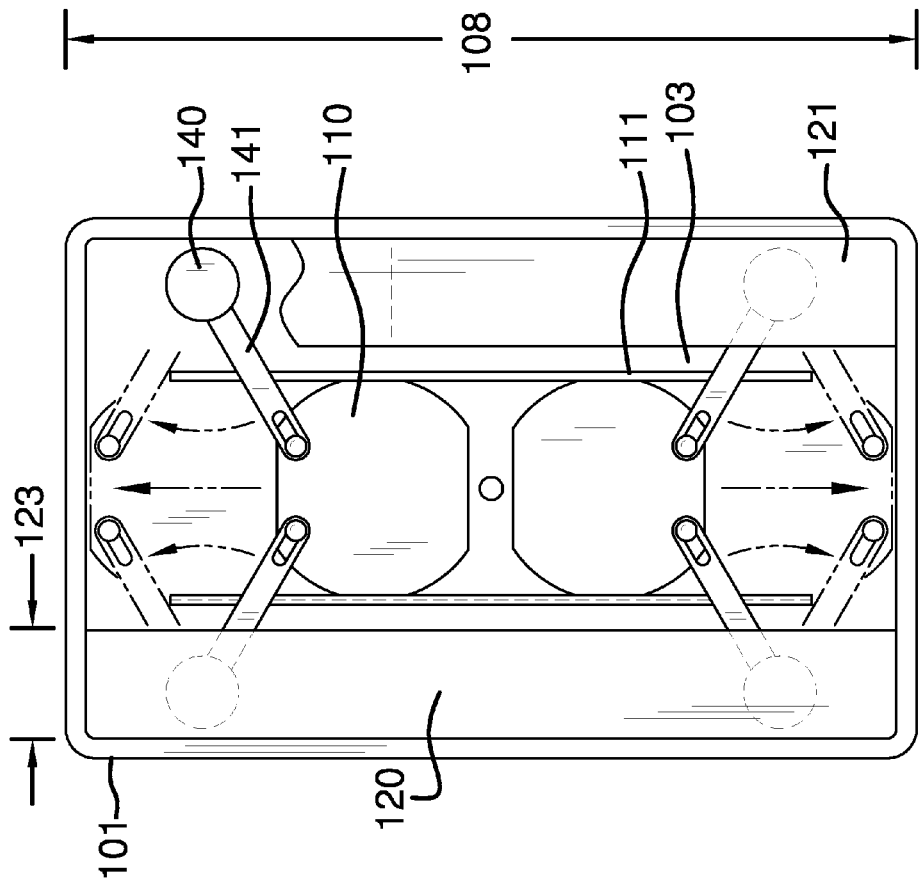
FIG. 5 is a rear view of the childproof safety outlet.
Figure 4:
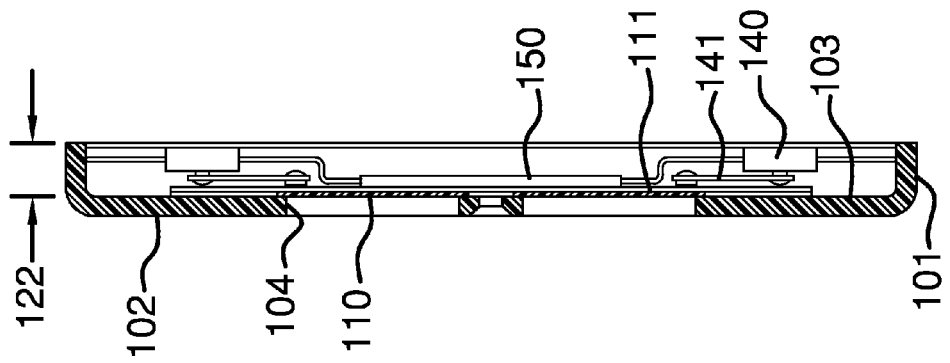
FIG. 4 is a cross-sectional view along line 4-4 in FIG. 2 of the childproof safety outlet.
Figure 6:
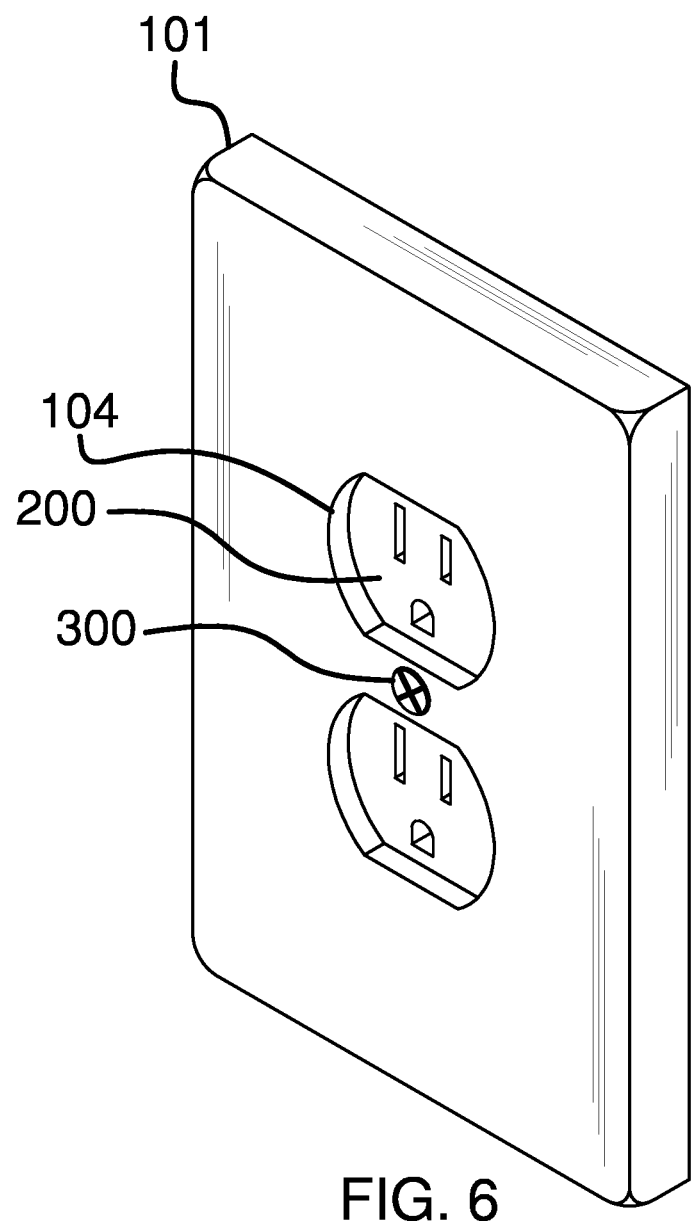
FIG. 6 is another perspective view of the childproof safety outlet installed on an existing electrical outlet.
Figure 7:
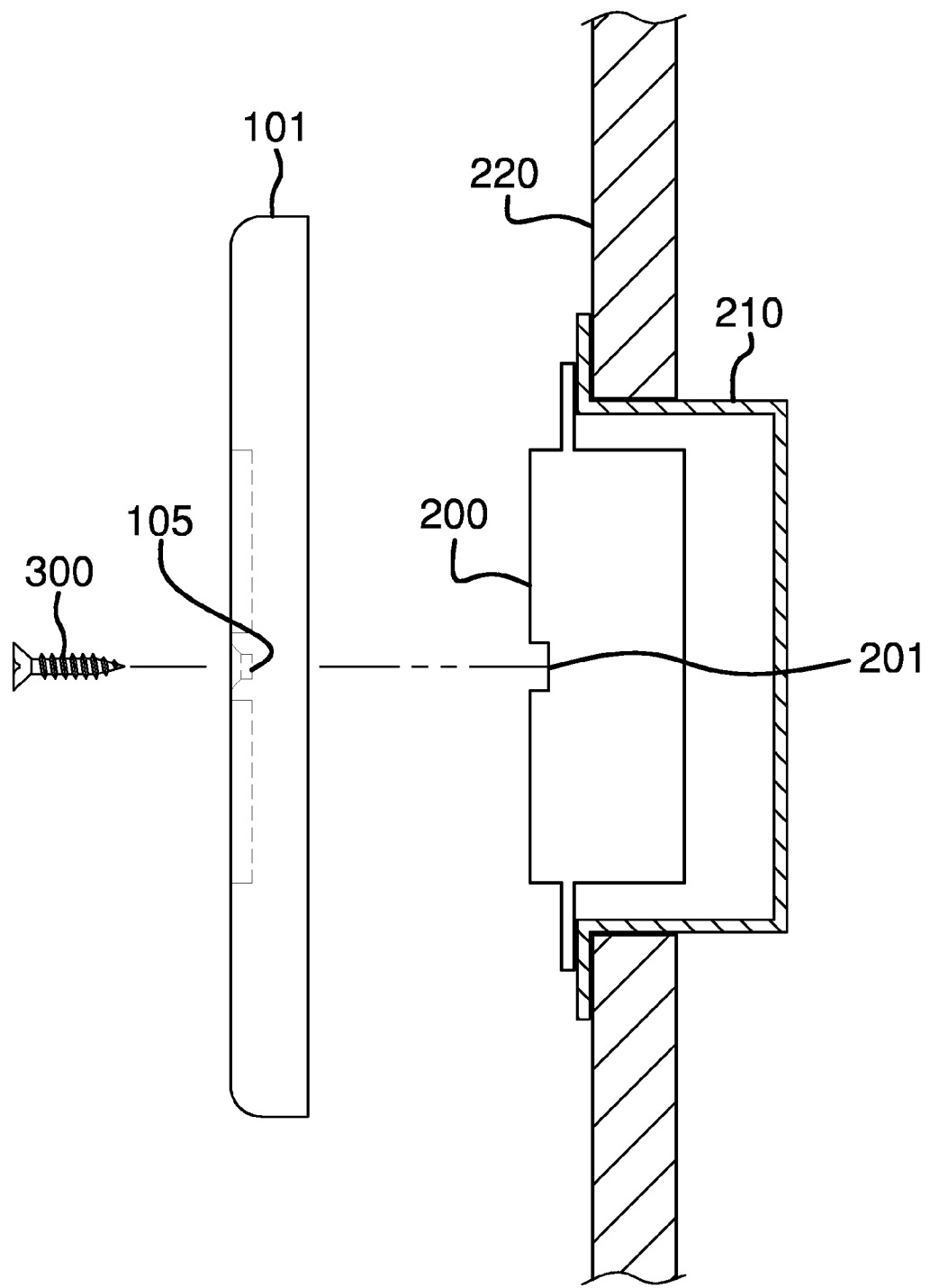
FIG. 7 is a cross-sectional view showing the electrical outlet and outlet box installed in a wall surface, and the childproof safety outlet aligned adjacent thereto.

Referring to FIG. 5, the electrical outlet cover 101 includes a left, rear cover plate 120 and a right, rear cover plate 121. Both, the left, rear cover plate 120 and the right, rear cover plate 121 are parallel with the inner surface 103 of the electrical outlet cover 101. The left, rear cover plate 120, and the right, rear cover plate 121 are separated from the inner surface 103 via a depth 122. Moreover, the left, rear cover plate 120 and the right, rear cover plate 121 extend a length 108 of the electrical outlet cover 101. The left, rear cover plate 120 and the right, rear cover plate 121 have a width 123. The width 123 is much less than a cover plate width 109 of the electrical outlet cover 101.

The left, rear cover plate 120 and the right, rear cover plate 121 are used to protect and partially enclose a servomotor 140 and an armature 141. The servomotor 140 and the armature 141 are provided on the left and right side of the cover plate 110. That being said, each cover plate 110 is provided two servomotors 140 and two armatures 141, which are located on the left and right side of the respective cover plate 110. The servomotors 140 rotate the armatures 141 in order to move the cover plate 110 longitudinally along the guide rails 111 in order to leave open or close off the respective outlet opening 104.

The servomotors 140 are wired to a control member 150, which is also located between the inner surface 103 of the electrical outlet cover 101 and either the left, rear cover plate 120 or the right, rear cover plate 121. The control member 150 is in wireless communication with a remote control 160. The remote control 160 includes an open button 161, a close button 162, and at least one cover plate button 163. The cover plate button(s) 163 is provided in order to designate the desired cover plate 110 to be operated, and is required where the invention 100 involves multiple cover plates 110 on the electrical outlet cover 101. The control member 150 and the remote control 160 are each provided a powering member, which ideally consists of at least one battery.

It shall be noted that the remote control 160 may also include a top button 164 and a bottom button 165, which corresponds with the outlet opening 104 that is positioned on the electrical outlet cover 101. It shall be noted that the top button 164 and the bottom button 165 are only included where the electrical outlet cover 101 has two outlet openings 104, which are aligned above one another.

With respect to the above description, it is to be realized that the optimum dimensional relationship for the various components of the invention 100, to include variations in size, materials, shape, form, function, and the manner of operation, assembly and use, are deemed readily apparent and obvious to one skilled in the art, and all equivalent relationships to those illustrated in the drawings and described in the specification are intended to be encompassed by the invention 100.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A childproof safety outlet cover comprising:
   an electrical outlet cover configured to attach onto an electrical outlet;
   wherein said electrical outlet cover includes at least one outlet opening behind which a cover plate is provided; said cover plate slides longitudinally with respect to the electrical outlet in order to close off or leave open the outlet opening thereby controlling access to the electrical outlet;
   wherein the electrical outlet cover is further defined with an outer surface and an inner surface;
   wherein the electrical outlet cover includes a screw hole that enables the electrical outlet cover to be secured to an outlet screw hole of the electrical outlet via a screw; wherein the electrical outlet is in turn secured to an electrical outlet box; wherein the electrical outlet box is in turn mounted to a wall surface;
   wherein the cover plate is supported on a guide rail, which is provided on the inner surface of the electrical outlet cover; wherein the guide rail enables the cover plate to move longitudinally in order to leave open or close off the outlet opening; wherein the cover plate is adjacent to the inner surface of the electrical outlet cover;
   wherein the electrical outlet cover includes a left, rear cover plate and a right, rear cover plate; wherein both the left, rear cover plate and the right, rear cover plate are parallel with the inner surface of the electrical outlet cover.

2. The childproof safety outlet according to claim 1 wherein the left, rear cover plate, and the right, rear cover plate are separated from the inner surface via a depth; wherein the left, rear cover plate and the right, rear cover plate extend a length of the electrical outlet cover; wherein the left, rear cover plate and the right, rear cover plate have a width; wherein the width is much less than a cover plate width of the electrical outlet cover.

3. The childproof safety outlet according to claim 2 wherein the left, rear cover plate and the right, rear cover plate are used to protect and partially enclose a servomotor and an armature.

4. The childproof safety outlet according to claim 3 wherein the servomotor and the armature are provided on the left and right side of the cover plate.

5. The childproof safety outlet according to claim 4 wherein the cover plate is provided two servomotors and two armatures, which are located on the left and right side of the cover plate, respectively.

6. The childproof safety outlet according to claim 5 wherein the servomotors rotate the armatures in order to move the cover plate longitudinally along the guide rails in order to leave open or close off the respective outlet opening.

7. The childproof safety outlet according to claim 6 wherein the servomotors are wired to a control member, which is also located between the inner surface of the electrical outlet cover and either the left, rear cover plate or the right, rear cover plate.

8. The childproof safety outlet according to claim 7 wherein the control member is in wireless communication with a remote control.

9. The childproof safety outlet according to claim 8 wherein the remote control includes an open button, a close button, and at least one cover plate button; wherein the at least one cover plate button is provided in order to designate and move longitudinally the cover plate, respectively.

* * * * *